United States Patent [19]
Künzel

[11] 3,762,994
[45] Oct. 2, 1973

[54] DRIVE ASSEMBLY FOR NUCLEAR REACTOR CONTROL RODS

[75] Inventor: Horst Künzel, Nurnberg, Germany

[73] Assignee: Siemens Aktiengesellschaft, Berlin & Munich, Germany

[22] Filed: Dec. 9, 1970

[21] Appl. No.: 96,468

[30] Foreign Application Priority Data
Dec. 10, 1969 Germany............... P 19 61 848.5

[52] U.S. Cl................................ 176/36 R, 176/36 S
[51] Int. Cl.................................................. G21c 7/14
[58] Field of Search................. 176/22, 36 R, 36 C, 176/36 SA, 86; 269/60, 61

[56] References Cited
UNITED STATES PATENTS

| | | | |
|---|---|---|---|
| 3,408,101 | 10/1968 | Savary | 176/36 R |
| 3,152,960 | 10/1964 | Alfred | 176/36 R |
| 3,503,268 | 3/1970 | Andrews | 176/36 R |
| 3,377,252 | 4/1968 | Knights | 176/36 R |
| 2,855,899 | 10/1958 | Beaty | 176/36 |
| 2,666,636 | 1/1954 | Wulff | 267/61 X |
| 2,301,742 | 11/1942 | Muller | 267/60 |

FOREIGN PATENTS OR APPLICATIONS

| | | | |
|---|---|---|---|
| 927,522 | 5/1963 | Great Britain | 176/36 R |
| 1,290,265 | 3/1969 | Germany | 176/36 R |
| 1,274,751 | 8/1968 | Germany | 176/36 R |

*Primary Examiner*—Harvey E. Behrend
*Attorney*—Curt M. Avery, Arthur E. Wilfond, Herbert L. Lerner and Daniel J. Tick

[57] ABSTRACT

A drive assembly for inserting and removing the control rod of a nuclear reactor has a guide tube arranged outside the reactor and a drive rod connectable to the control rod. The drive rod is movable within the tube between raised and lowered positions and a holding device is provided for holding the drive rod in a raised position. A spring surrounding the drive rod is compressed when the lifting device holds the drive rod in the raised position. The shock absorber disposed at the lower region of the guide tube receives the impact of the spring when the drive rod is released by the holding device.

7 Claims, 4 Drawing Figures

DRIVE ASSEMBLY FOR NUCLEAR REACTOR CONTROL RODS

My invention relates to a drive assembly for control rods of nuclear reactors. The drive assembly has a holder device with a lifter, a magnet coupling, a drive rod and a starter spring as well as a shock absorber. Such control rods are normally used to control the output of the nuclear reactor and for this purpose the absorber portion of the control rod is moved to a greater or lesser depth into the nuclear core with the assistance of a drive motor. These control rods have still a second task for the case where it is necessary to rapidly shut down the nuclear reactor. In such an instance, the absorber portion must be moved with the highest possible speed into the reactor core and thereby break the chain reaction taking place in the nuclear reactor. Since the speed of the normal drive motor is not adequate for this purpose, a magnetic coupling is provided in the drive linkage. The excitation of this magnet coupling is interrupted and the drive rods together with the absorber portions connected to the latter drop by gravity into the reactor core. However, this falling action is impeded by inertial forces. In response to this situation, so-called shock impulse devices have been provided which impart a greater initial acceleration to the linkage and the absorber. These devices can for example be electrical, however, usually for this purpose they are so-called starter springs. In the event it is necessary to rapidly shut down the reactor, these springs remain in a fully stressed condition during the entire normal regulating operation and impart the maximum energy stored therein to the control rods independent of their initial position.

In practice, however, this acceleration of the same magnitude is nontheless not always desirable, especially, when the absorber has already been partially extended into the reactor core and a quick initial acceleration is no longer necessary. A corresponding reduction of the energy stored in the starter spring in dependence on the initial position of the absorber in the reactor would be very desirable for the dimensioning and operational life of the shock absorber.

It is an object of my invention to provide a drive assembly for nuclear reactor control rods requiring the smallest possible construction cost and which are suitable for use with a liquid metal cooled nuclear reactor.

It is another object of my invention to provide a control rod drive assembly for use with a nuclear reactor which facilitates the rapid shut-down of the nuclear reactor.

The drive assembly for inserting and removing the control rod of the nuclear reactor of the invention includes a guide tube arranged outside the reactor and a drive rod connectable to the control rod. The drive rod is movable within the tube between raised and lowered positions. According to a feature of the invention, a holding means is provided for holding the drive rod in the raised position and a spring surrounds the drive rod. Means are positioned with respect to the drive rod for compressing the spring when the holding means holds the drive rod in the raised position.

According to another feature of the invention, a tubular housing surrounds the spring for guiding the latter and has an opening directed toward the nuclear reactor.

The invention will now be described with reference to the drawings wherein.

Figure 1:
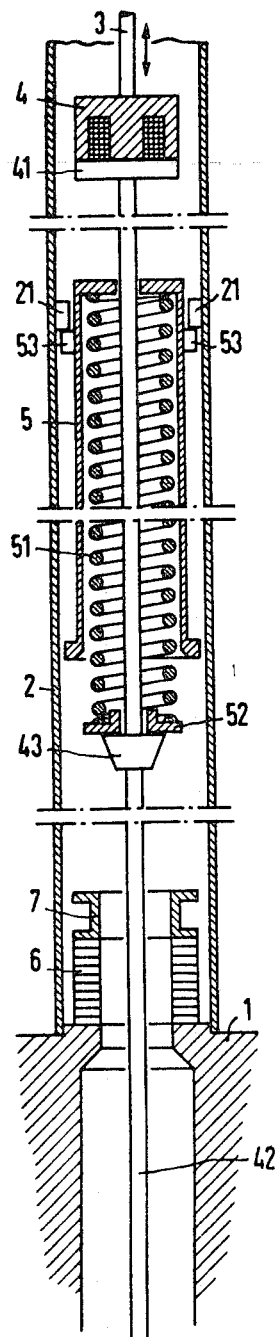
FIG. 1 illustrates a drive assembly for nuclear reactor control rods according to the invention. The control rod drive is illustrated in its position wherein the starter spring is in the stressed condition.
Figure 4:
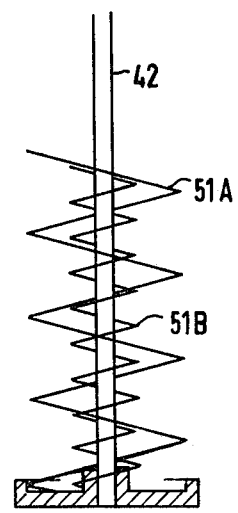
FIG. 4 illustrates an embodiment of the starter spring wherin the latter comprises two helical springs surrounding the drive rod and wound in mutually opposite directions.

Referring to FIG. 1. reference numeral 1 designates the cover of the reactor container through which the control rod drive extends into the reactor core proper. A guide tube 2 is attached to this cover. Not illustrated in the figure is the upper portion of the guide tube 2 whereat there is a drive motor. In addition, the upper part of the guide tube is closed. A lifter 3 is connected with the drive motor and, at the lower end of the lifter, there is provided a magnetic coupling which is energized via connecting leads not illustrated. A drive rod 42 is secured to the armature plate 41 of this coupling and to the lower end of the drive rod 42, there hangs the absorber rod or control rod, which is insertable into the core of the nuclear reactor. A carrier cone 43 is rigidly secured to the drive rod 42 for accommodating the spring plate 52. The lower end of the starter spring 51 abuts against the spring plate 52. If required, the starter spring 51 can consist of two halves 51A and 51B coiled in mutually opposite directions as illustrated in FIG. 4. Referring again to FIG. 1, the spring 51 is held at its upper end by a spring housing 5. The spring housing 5 abuts against stops 21 of the guide tube 2 via projections 53. According to the position of the drive or control rod or the magnetic coupling 4, the spring 51 is in stress to a greater or less degree. The stress in the spring is at its highest and therefore, its release energy is at its greatest when the absorber connected to the drive rod 42 is fully removed from the reactor core. In contrast, the release energy is lower the deeper the aborber extends into the reactor core or the greater the distance between the carrier cone 43 and the stop 21 on the guiding tube becomes.

Figure 2:
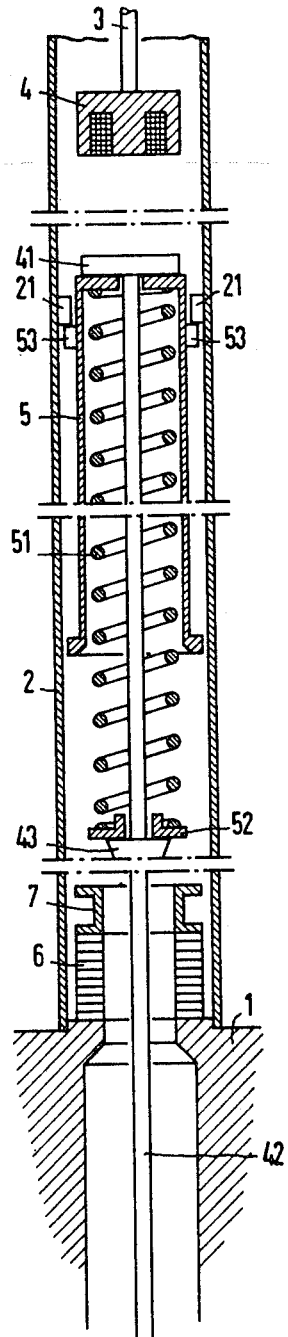
FIG. 2 illustrates the drive assembly of FIG. 1 wherein the starter spring is fully relaxed and after the turnoff signal for the nuclear reactor has been initiated.

FIG. 2 illustrates a point in time shortly after the turn-off command is initiated. The magnetic coupling 4 is deenergized and has released the armature plate 41. The latter and the drive rod 42 as well as the absorber are accelerated downwardly by the force of the starter spring 51. Only when the armature plate 41 comes into contact with the tubular housing 5 is the spring 51 completely released and is moved along by this armature plate 41 in the downward direction.

Figure 3:
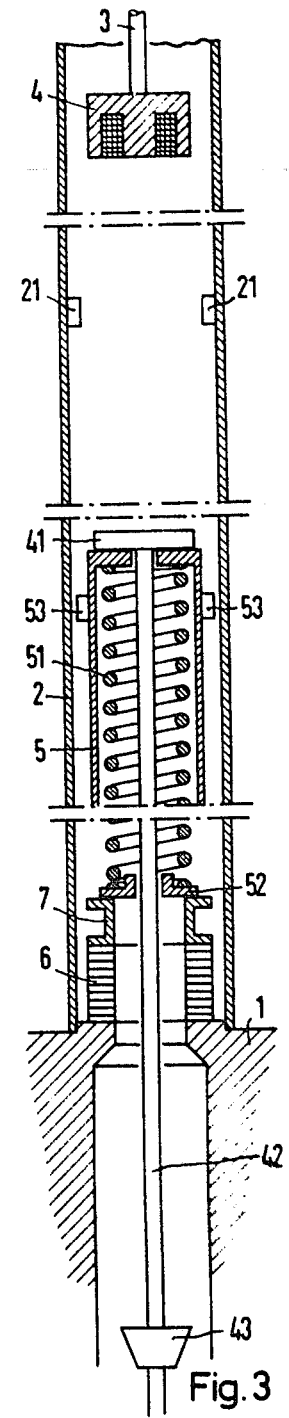
FIG. 3 illustrates the drive assembly when the absorber is at its end position in the reactor core.

The end of the downward movement is illustrated in FIG.3. The lower spring plate 52 butts against an impact ring 7 arranged in the guide tube 2 so that the spring 51 becomes compressed and thereby breaks the downward movement of the drive rod. The remaining portion of the kinetic energy of the drive system is taken up by a very strong spring 6, for example, a plate or ring spring when the spring housing likewise impacts against this impact ring 7. The operation of the spring or this shock absorber can be further assisted by means of additional shock absorbers as is coventional in the state of the art within the control rod guiding tube inside the reactor core or also partially outside of the latter. These shock absorbers within the reactor container can for example be of the hydraulic type.

FIG. 3 illustrates that the starter spring is again in the stressed condition after the drive rod is at its lower position. By the stressing action, the starter spring assists in breaking the downward movement of the drive rod shortly before it reaches its lower position or the position corresponding to the position whereat the absorber extends fully in the core of the reactor. These three illustrated operational phases of the drive assembly according to the invention also show that the starter spring after its decompression becomes again useful and works in the opposite direction to impart a braking action to the downwardly moving drive rod.

For a subsequent operation of the pertinent nuclear reactor, the magnetic coupling 4 is lowered by means of the drive motor referred above and not illustrated in the drawing. Upon reaching the armature plate 41, the excitation to the magnetic coupling 4 is energized. With the upward travel of the magnetic coupling 4, the drive rod 42 is raised together with the upward moving magnet cup 4, wherewith the initial load that must be carried by the drive motor is made substantially smaller than in the present day configurations because of the force imparted by the stressed starter spring 5 at the outset of the upward movement. The upward movement of the spring housing 5 is terminated after a given distance by the limit stop 21 so that from this instant through the remaining portion of the upward movement of the drive rod 42, the starter spring is placed in tension to an ever greater degree.

To further illustrate the principal of the invention, it should be mentioned that, for example, for the accelerating action of the starter spring, 80 percent of the total distance stands available, whereas 20 percent of the path of travel of the drive rod is available for the decelerating action. The stress force of the spring at lower position of the drive rod 42 corresponds to approximately the weight of the drive rod assembly members loaded thereon. As already mentioned, the then still available movement energy is taken up by the shock absorber 6 as well as the shock absorbers disposed at the interior of the reactor container. Excessive force of the starter spring 51 is prevented by the bracing action afforded by the spring housing 5 against the spring plate 52.

While the invention is described by means of specific example and a specific embodiment, I do not wish to be limited thereto, for obvious modifications will occur to those skilled in the art without departing from the scope of the invention and the claims annexed hereto.

I claim:

1. Apparatus for inserting and removing a control rod of a nuclear reactor, comprising a guide tube arranged outside of said nuclear reactor, a drive rod connectable to the control rod, said drive rod being movable within said tube between raised and lowered positions, holding means for holding said drive rod in the raised position, spring means surrounding said drive rod, spring compression means engageable by said drive rod and said spring means and operable, upon release of said holding means, to cause said spring means to rapidly drive said drive rod toward its lower position, and engageable means on said drive rod engaging said spring compression means to move the latter towards a lower position and to compress said spring means such that the latter at least partially absorbs the impact of said drive rod and control rod as the latter approaches their lower position.

2. Apparatus according to claim 1 wherein the longitudinal length of said spring means in uncompressed condition is less than the maximum stroke of said drive rod.

3. Apparatus according to claim 1 comprising stop means on said guide tube limiting the raised position of said spring compression means, said spring compression means having an upper portion engageable by said spring means such that when said drive rod is in its raised position, said spring means urges said spring compression means against said stop means and biases said drive rod toward a lower direction.

4. Apparatus according to claim 3 comprising a second stop means for said spring means disposed in a lower portion of said guide tube, said spring means being compressed between said second stop means and said upper engageable portion on said spring compression means to absorb the impact of said drive rod and control rod as the latter approach their lower position.

5. Apparatus according to claim 4 wherein said second stop means comprises a second spring means which is substantially less compressible per unit force applied through said first mentioned spring means.

6. Apparatus according to claim 4 wherein said spring compression means has a lower end portion which engages said second stop means to determine the lower position of said spring compression means.

7. Apparatus according to claim 1 wherein said spring compression means is a tube element in which said spring means is disposed, the longitudinal length of said tube element being at least approximately equal to the longitudinal length of said spring means, under the condition when said spring means is subjected to carrying the load of said control rod and drive rod.

* * * * *